US012777528B2

(12) United States Patent
Koskinen et al.

(10) Patent No.: US 12,777,528 B2
(45) Date of Patent: Oct. 27, 2026

(54) METHODS, APPARATUSES, AND COMPUTER READABLE MEDIA FOR RANDOM ACCESS IN CASE OF CONGESTION

(71) Applicant: Nokia Technologies Oy, Espoo (FI)

(72) Inventors: Jussi-Pekka Koskinen, Oulu (FI); Samuli Heikki Turtinen, Oulu (FI); Chunli Wu, Beijing (CN)

(73) Assignee: Nokia Technologies Oy, Espoo (FI)

( * ) Notice: Subject to any disclaimer, the term of this patent is extended or adjusted under 35 U.S.C. 154(b) by 249 days.

(21) Appl. No.: 18/564,368

(22) PCT Filed: Jun. 22, 2021

(86) PCT No.: PCT/CN2021/101391

§ 371 (c)(1),
(2) Date: Nov. 27, 2023

(87) PCT Pub. No.: WO2022/266822

PCT Pub. Date: Dec. 29, 2022

(65) Prior Publication Data

US 2024/0251449 A1 Jul. 25, 2024

(51) Int. Cl.
*H04W 74/0833* (2024.01)
*H04W 74/00* (2009.01)
*H04W 28/02* (2009.01)

(52) U.S. Cl.
CPC ..... *H04W 74/0833* (2013.01); *H04W 74/006* (2013.01); *H04W 28/0289* (2013.01)

(58) Field of Classification Search
CPC ........... H04W 74/0833; H04W 74/006; H04W 28/0289; H04W 74/0838
See application file for complete search history.

(56) References Cited

U.S. PATENT DOCUMENTS 10,873,975 B2 12/2020 Freda et al.
10,966,255 B2 * 3/2021 Liu ...................... H04W 76/19
(Continued)

FOREIGN PATENT DOCUMENTS

CN 104919885 A 9/2015
CN 108886812 A 11/2018
(Continued)

OTHER PUBLICATIONS

"3rd Generation Partnership Project; Technical Specification Group Radio Access Network; NR; Radio Resource Control (RRC) protocol specification (Release 16)", 3GPP TS 38.331, V16.4.1, Mar. 2021, pp. 1-949.
(Continued)

*Primary Examiner* — Chandrahas B Patel
(74) *Attorney, Agent, or Firm* — Lippes Mathias LLP

(57) ABSTRACT

Disclosed are methods for paging. An example method may include selecting, by a user equipment, a random access resource from a second group of random access resources, and performing a random access procedure on the selected random access resource, wherein the second group of random access resources may be different from a first group of random access resources, and the first group of random access resources may be associated with an event triggering the random access procedure and/or a type of the user equipment. Related apparatuses and computer readable media are also disclosed.

14 Claims, 3 Drawing Sheets

(56) References Cited

U.S. PATENT DOCUMENTS

| | | | | |
|---|---|---|---|---|
| 11,229,055 | B2 * | 1/2022 | Tsai | H04W 72/23 |
| 11,265,920 | B2 * | 3/2022 | Jin | H04W 36/0077 |
| 12,082,235 | B2 * | 9/2024 | Chen | H04W 74/04 |
| 2016/0157271 | A1 | 6/2016 | Zhang et al. | |
| 2017/0280484 | A1 | 9/2017 | Awad | |
| 2019/0053120 | A1 | 2/2019 | Park et al. | |
| 2020/0154326 | A1 | 5/2020 | Deenoo et al. | |
| 2020/0314917 | A1 | 10/2020 | Jeon et al. | |
| 2021/0051732 | A1 | 2/2021 | Choe et al. | |
| 2021/0058971 | A1 | 2/2021 | MolavianJazi et al. | |
| 2021/0105813 | A1 | 4/2021 | Lee et al. | |

FOREIGN PATENT DOCUMENTS

| | | | |
|---|---|---|---|
| CN | 110476474 | A | 11/2019 |
| CN | 112806086 | A | 5/2021 |
| WO | 2018/063063 | A1 | 4/2018 |
| WO | 2020191766 | A1 | 10/2020 |

OTHER PUBLICATIONS

"3rd Generation Partnership Project; Technical Specification Group Radio Access Network; NR; Medium Access Control (MAC) protocol specification (Release 16)", 3GPP TS 38.321, V16.4.0, Mar. 2021, pp. 1-157.

"Summary of [AT113-e][108 [REDCAP] UE identification and access restriction", 3GPP TSG-RAN WG2 #113-e, R2-2102108, Agenda: 8.12.1, Ericsson, Jan. 25-Feb. 5, 2021, pp. 1-18.

Nwogu et al., "A Combined Static/Dynamic Partitioned Resource Usage Approach for Random Access in 5G Cellular Networks", International Conference on Software, Telecommunications and Computer Networks (SoftCOM), Sep. 19-21, 2019, 6 pages.

International Search Report and Written Opinion received for corresponding Patent Cooperation Treaty Application No. PCT/CN2021/101391, dated Mar. 23, 2022, 9 pages.

"Differentiated random access in NR", 3GPP TSG-RAN WG2 Meeting NR ad hoc 2, R2-1706518, Agenda: 10.3.1.4.1, Qualcomm Incorporated, Jun. 27-29, 2017, pp. 1-3.

Extended European Search Report received for corresponding European Patent Application No. 21946324.7, dated Jan. 21, 2025, 10 pages.

Office action received for corresponding Chinese Patent Application No. 202180099754.5, dated Apr. 10, 2026, 9 pages of office action and no page of translation available.

* cited by examiner

METHODS, APPARATUSES, AND COMPUTER READABLE MEDIA FOR RANDOM ACCESS IN CASE OF CONGESTION

RELATED APPLICATION

This application was originally filed as PCT Application No. PCT/CN2021/101391, filed on Jun. 22, 2021, which is incorporated herein by reference in its entirety.

TECHNICAL FIELD

Various embodiments relate to methods, apparatuses, and computer readable media for random access in case of congestion.

BACKGROUND

A random access (RA) resource may refer to time and/or frequency resource used for RA procedure, including e.g. a physical random access channel (PRACH) resource, a preamble, etc. RA partitioning can be achieved by partitioning the RA resources, e.g. different PRACH resources or different preambles to different events triggering RA procedures, such as small data transmission (SDT), coverage enhancement (CovEnh), slicing, etc., or different types of user equipments (UEs), such as reduced capability (RedCap), etc. Congestion may occur in the RA procedure, for example, in some scenarios some RA resources may be overloaded while other RA resources are not, and in addition in some scenarios, usage of the RA resources may not be balanced, e.g. some RA resources are used more than others.

SUMMARY

A brief summary of exemplary embodiments is provided below to provide basic understanding of some aspects of various embodiments. It should be noted that this summary is not intended to identify key features of essential elements or define scopes of the embodiments, and its sole purpose is to introduce some concepts in a simplified form as a preamble for a more detailed description provided below.

In a first aspect, disclosed is a method. The method may include selecting, by a user equipment, a random access resource from a second group of random access resources, and performing a random access procedure on the selected random access resource, wherein the second group of random access resources may be different from a first group of random access resources, and the first group of random access resources may be associated with an event triggering the random access procedure and/or a type of the user equipment.

In some embodiments, the random access resource may be selected after a previous random access procedure or a previous random access attempt fails.

In some embodiments, at least one random access resource of the second group of random access resources may be associated with another event triggering a random access procedure and/or another type of a user equipment.

In some embodiments, the method may further include receiving, via a dedicated and/or broadcast signaling from a network apparatus, an indication indicating whether the at least one random access resource of the second group of random access resources is allowed for the selection.

In some embodiments, the method may further include receiving at least one selection probability associated with the at least one random access resource of the second group of random access resources, wherein the random access resource may be selected based at least partly on the at least one selection probability.

In some embodiments, the second group of random access resources may be configured by a network apparatus via a dedicated and/or broadcast signaling.

In some embodiments, the second group of random access resources may be indicated in a random access response or MSGB in the previous random access procedure or the previous random access attempt.

In some embodiments, the second group of random access resources may include a common random access resource.

In some embodiments, the method may further include transmitting information indicating the event triggering the random access procedure and/or the type of the user equipment.

In a second aspect, disclosed is a method. The method may include processing a random access procedure performed by a user equipment on a random access resource, wherein the random access resource may be selected by the user equipment from a second group of random access resources, and wherein the second group of random access resources may be different from a first group of random access resources, and the first group of random access resources may be associated with an event triggering the random access procedure and/or a type of the user equipment.

In some embodiments, the random access resource may be selected by the user equipment after a previous random access procedure or a previous random access attempt fails.

In some embodiments, at least one random access resource of the second group of random access resources may be associated with another event triggering a random access procedure and/or another type of a user equipment.

In some embodiments, the method may further include transmitting, via a dedicated and/or broadcast signaling, an indication indicating whether the at least one random access resource of the second group of random access resources is allowed for the selection.

In some embodiments, the method may further include transmitting at least one selection probability associated with the at least one random access resource of the second group of random access resources, wherein the random access resource may be selected by the user equipment based at least partly on the at least one selection probability.

In some embodiments, the method may further include configuring the second group of random access resources via a dedicated and/or broadcast signaling.

In some embodiments, the second group of random access resources may be indicated in a random access response or MSGB in the previous random access procedure or the previous random access attempt.

In some embodiments, the second group of random access resources may include a common random access resource.

In some embodiments, the method may further include receiving information indicating the event triggering the random access procedure and/or the type of the user equipment.

In a third aspect, disclosed is an apparatus. The apparatus may include at least one processor and at least one memory. The at least one memory may include computer program code, and the at least one memory and the computer program code may be configured to, with the at least one processor, cause the apparatus as a user equipment to perform selecting a random access resource from a second group of random access resources, and performing a random access procedure on the selected random access resource, wherein the second group of random access resources may be different from a first group of random access resources, and the first group of random access resources may be associated with an event triggering the random access procedure and/or a type of the user equipment.

In some embodiments, the random access resource may be selected after a previous random access procedure or a previous random access attempt fails.

In some embodiments, at least one random access resource of the second group of random access resources may be associated with another event triggering a random access procedure and/or another type of a user equipment.

In some embodiments, the at least one memory and the computer program code may be further configured to, with the at least one processor, cause the apparatus to further perform receiving, via a dedicated and/or broadcast signaling from a network apparatus, an indication indicating whether the at least one random access resource of the second group of random access resources is allowed for the selection.

In some embodiments, the at least one memory and the computer program code may be further configured to, with the at least one processor, cause the apparatus to further perform receiving at least one selection probability associated with the at least one random access resource of the second group of random access resources, wherein the random access resource may be selected based at least partly on the at least one selection probability.

In some embodiments, the second group of random access resources may be configured by a network apparatus via a dedicated and/or broadcast signaling.

In some embodiments, the second group of random access resources may be indicated in a random access response or MSGB in the previous random access procedure or the previous random access attempt.

In some embodiments, the second group of random access resources may include a common random access resource.

In some embodiments, the at least one memory and the computer program code may be further configured to, with the at least one processor, cause the apparatus to further perform transmitting information indicating the event triggering the random access procedure and/or the type of the user equipment.

In a fourth aspect, disclosed is an apparatus. The apparatus may include at least one processor and at least one memory. The at least one memory may include computer program code, and the at least one memory and the computer program code may be configured to, with the at least one processor, cause the apparatus to perform processing a random access procedure performed by a user equipment on a random access resource, wherein the random access resource may be selected by the user equipment from a second group of random access resources, and wherein the second group of random access resources may be different from a first group of random access resources, and the first group of random access resources may be associated with an event triggering the random access procedure and/or a type of the user equipment.

In some embodiments, the random access resource may be selected by the user equipment after a previous random access procedure or a previous random access attempt fails.

In some embodiments, at least one random access resource of the second group of random access resources may be associated with another event triggering a random access procedure and/or another type of a user equipment.

In some embodiments, the at least one memory and the computer program code may be further configured to, with the at least one processor, cause the apparatus to further perform transmitting, via a dedicated and/or broadcast signaling, an indication indicating whether the at least one random access resource of the second group of random access resources is allowed for the selection.

In some embodiments, the at least one memory and the computer program code may be further configured to, with the at least one processor, cause the apparatus to further perform transmitting at least one selection probability associated with the at least one random access resource of the second group of random access resources, wherein the random access resource may be selected by the user equipment based at least partly on the at least one selection probability.

In some embodiments, the at least one memory and the computer program code may be further configured to, with the at least one processor, cause the apparatus to further perform configuring the second group of random access resources via a dedicated and/or broadcast signaling.

In some embodiments, the second group of random access resources may be indicated in a random access response or MSGB in the previous random access procedure or the previous random access attempt.

In some embodiments, the second group of random access resources may include a common random access resource.

In some embodiments, the at least one memory and the computer program code may be further configured to, with the at least one processor, cause the apparatus to further perform receiving information indicating the event triggering the random access procedure and/or the type of the user equipment.

In a fifth aspect, disclosed is an apparatus. The apparatus as a user equipment may include means for selecting a random access resource from a second group of random access resources, and means for performing a random access procedure on the selected random access resource, wherein the second group of random access resources may be different from a first group of random access resources, and the first group of random access resources may be associated with an event triggering the random access procedure and/or a type of the user equipment.

In some embodiments, the random access resource may be selected after a previous random access procedure or a previous random access attempt fails.

In some embodiments, at least one random access resource of the second group of random access resources may be associated with another event triggering a random access procedure and/or another type of a user equipment.

In some embodiments, the apparatus may further include means for receiving, via a dedicated and/or broadcast signaling from a network apparatus, an indication indicating whether the at least one random access resource of the second group of random access resources is allowed for the selection.

In some embodiments, the apparatus may further include means for receiving at least one selection probability associated with the at least one random access resource of the second group of random access resources, wherein the random access resource may be selected based at least partly on the at least one selection probability.

In some embodiments, the second group of random access resources may be configured by a network apparatus via a dedicated and/or broadcast signaling.

In some embodiments, the second group of random access resources may be indicated in a random access response or MSGB in the previous random access procedure or the previous random access attempt.

In some embodiments, the second group of random access resources may include a common random access resource.

In some embodiments, the apparatus may further include means for transmitting information indicating the event triggering the random access procedure and/or the type of the user equipment.

In a sixth aspect, disclosed is an apparatus. The apparatus may include means for processing a random access procedure performed by a user equipment on a random access resource, wherein the random access resource may be selected by the user equipment from a second group of random access resources, and wherein the second group of random access resources may be different from a first group of random access resources, and the first group of random access resources may be associated with an event triggering the random access procedure and/or a type of the user equipment.

In some embodiments, the random access resource may be selected by the user equipment after a previous random access procedure or a previous random access attempt fails.

In some embodiments, at least one random access resource of the second group of random access resources may be associated with another event triggering a random access procedure and/or another type of a user equipment.

In some embodiments, the apparatus may further include means for transmitting, via a dedicated and/or broadcast signaling, an indication indicating whether the at least one random access resource of the second group of random access resources is allowed for the selection.

In some embodiments, the apparatus may further include means for transmitting at least one selection probability associated with the at least one random access resource of the second group of random access resources, wherein the random access resource may be selected by the user equipment based at least partly on the at least one selection probability.

In some embodiments, the apparatus may further include means for configuring the second group of random access resources via a dedicated and/or broadcast signaling.

In some embodiments, the second group of random access resources may be indicated in a random access response or MSGB in the previous random access procedure or the previous random access attempt.

In some embodiments, the second group of random access resources may include a common random access resource.

In some embodiments, the apparatus may further include means for receiving information indicating the event triggering the random access procedure and/or the type of the user equipment.

In a seventh aspect, a computer readable medium is disclosed. The computer readable medium may include instructions stored thereon for causing an apparatus as a user equipment to perform selecting a random access resource from a second group of random access resources, and performing a random access procedure on the selected random access resource, wherein the second group of random access resources may be different from a first group of random access resources, and the first group of random access resources may be associated with an event triggering the random access procedure and/or a type of the user equipment.

In some embodiments, the random access resource may be selected after a previous random access procedure or a previous random access attempt fails.

In some embodiments, at least one random access resource of the second group of random access resources may be associated with another event triggering a random access procedure and/or another type of a user equipment.

In some embodiments, the computer readable medium may further include instructions stored thereon for causing an apparatus to further perform receiving, via a dedicated and/or broadcast signaling from a network apparatus, an indication indicating whether the at least one random access resource of the second group of random access resources is allowed for the selection.

In some embodiments, the computer readable medium may further include instructions stored thereon for causing an apparatus to further perform receiving at least one selection probability associated with the at least one random access resource of the second group of random access resources, wherein the random access resource may be selected based at least partly on the at least one selection probability.

In some embodiments, the second group of random access resources may be configured by a network apparatus via a dedicated and/or broadcast signaling.

In some embodiments, the second group of random access resources may be indicated in a random access response or MSGB in the previous random access procedure or the previous random access attempt.

In some embodiments, the second group of random access resources may include a common random access resource.

In some embodiments, the computer readable medium may further include instructions stored thereon for causing an apparatus to further perform transmitting information indicating the event triggering the random access procedure and/or the type of the user equipment.

In an eighth aspect, a computer readable medium is disclosed. The computer readable medium may include instructions stored thereon for causing an apparatus to perform processing a random access procedure performed by a user equipment on a random access resource, wherein the random access resource may be selected by the user equipment from a second group of random access resources, and wherein the second group of random access resources may be different from a first group of random access resources, and the first group of random access resources may be associated with an event triggering the random access procedure and/or a type of the user equipment.

In some embodiments, the random access resource may be selected by the user equipment after a previous random access procedure or a previous random access attempt fails.

In some embodiments, at least one random access resource of the second group of random access resources may be associated with another event triggering a random access procedure and/or another type of a user equipment.

In some embodiments, the computer readable medium may further include instructions stored thereon for causing an apparatus to further perform transmitting, via a dedicated and/or broadcast signaling, an indication indicating whether the at least one random access resource of the second group of random access resources is allowed for the selection.

In some embodiments, the computer readable medium may further include instructions stored thereon for causing an apparatus to further perform transmitting at least one selection probability associated with the at least one random access resource of the second group of random access resources, wherein the random access resource may be selected by the user equipment based at least partly on the at least one selection probability.

In some embodiments, the computer readable medium may further include instructions stored thereon for causing an apparatus to further perform configuring the second group of random access resources via a dedicated and/or broadcast signaling.

In some embodiments, the second group of random access resources may be indicated in a random access response or MSGB in the previous random access procedure or the previous random access attempt.

In some embodiments, the second group of random access resources may include a common random access resource.

In some embodiments, the computer readable medium may further include instructions stored thereon for causing an apparatus to further perform receiving information indicating the event triggering the random access procedure and/or the type of the user equipment.

Other features and advantages of the example embodiments of the present disclosure will also be apparent from the following description of specific embodiments when read in conjunction with the accompanying drawings, which illustrate, by way of example, the principles of example embodiments of the present disclosure.

BRIEF DESCRIPTION OF THE DRAWINGS

Some example embodiments will now be described, by way of non-limiting examples, with reference to the accompanying drawings.

Throughout the drawings, same or similar reference numbers indicate same or similar elements. A repetitive description on the same elements would be omitted.

DETAILED DESCRIPTION

Herein below, some example embodiments are described in detail with reference to the accompanying drawings. The following description includes specific details for the purpose of providing a thorough understanding of various concepts. However, it will be apparent to those skilled in the art that these concepts may be practiced without these specific details. In some instances, well known circuits, techniques and components are shown in block diagram form to avoid obscuring the described concepts and features.

The usage of the RA resources may be optimized in case of congestion according to embodiments of the present disclosure.

Figure 1:
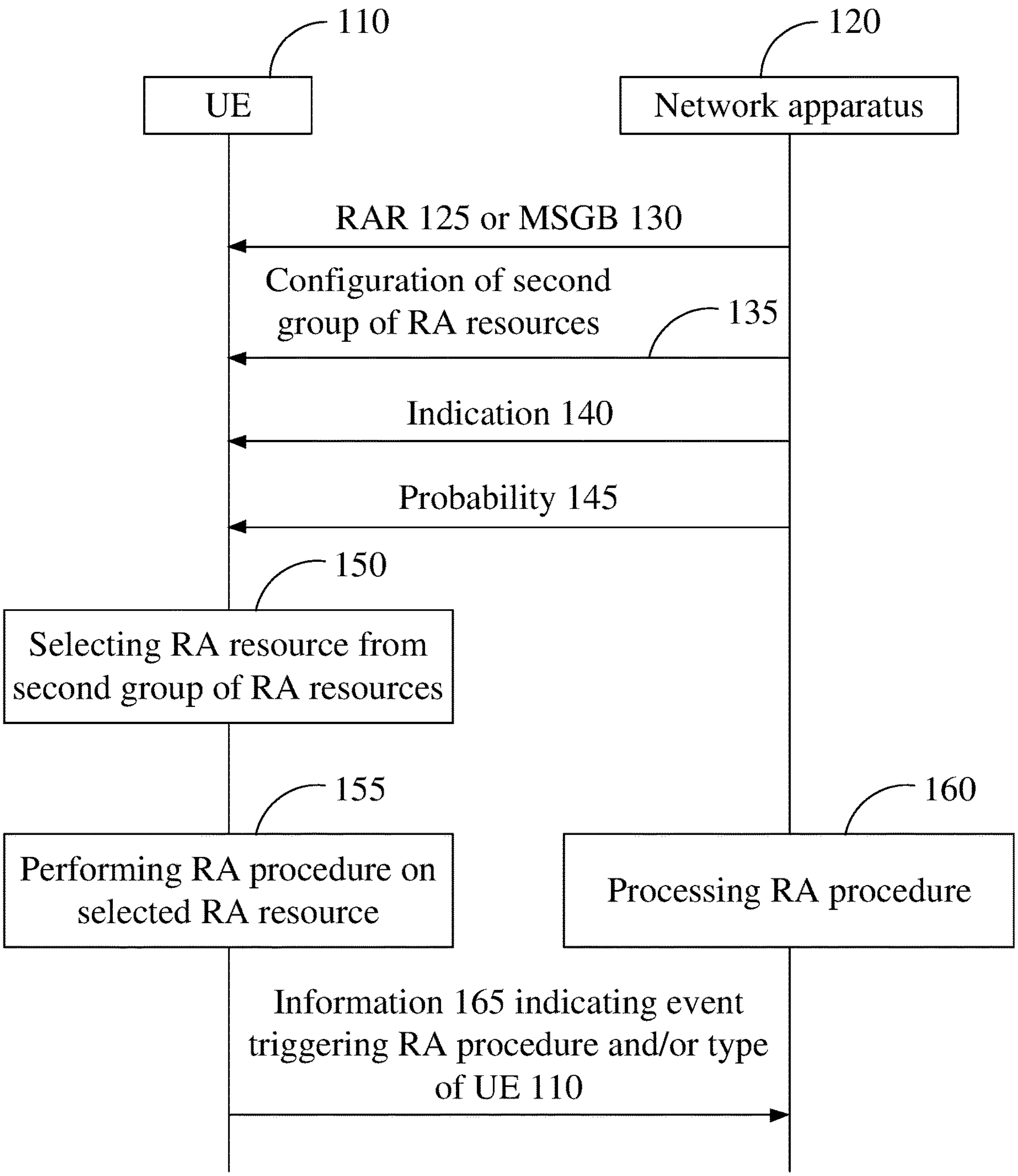
FIG. 1 shows an exemplary sequence chart for random access in case of congestion according to an embodiment of the present disclosure.

FIG. 1 shows an exemplary sequence chart for random access in case of congestion according to an embodiment of the present disclosure. Referring to the FIG. 1, a UE 110 may be the UE to perform the RA procedure, and a network apparatus 120 may be an apparatus of network side e.g. in a base station (BS) in radio access network (RAN). The UE 110 is located in a cell the network apparatus 120 covers.

Before the RA procedure, the RA partitioning may have been configured at the UE 110 by the network side e.g. the network apparatus 120 via e.g. a system information block (SIB) or a dedicated RRC signaling (e.g., RRCRelease). For example, a first group of RA resources may be associated with an event triggering a RA procedure such as SDT, CovEnh, slicing, etc., and/or a type of a UE, such as single antenna/branch (1Rx) RedCap, dual antenna/branch (2Rx) RedCap etc.

Additionally or alternatively, in an embodiment, the association or a part of the association may be preconfigured at the UE 110, and in this case the network apparatus 120 may not configure the association or the part of the association.

It may be appreciated that the above association is an example, and various associations may be configured or preconfigured.

The UE 110 may be provided with a second group of RA resources for performing a RA procedure, which may be triggered by an event triggering the RA procedure or the type of the UE 110 associated with the first group of RA resources, and the second group of RA resources may be different from the first group of RA resources. A RA procedure may include a plurality of RA attempts. In a case where a RA attempt succeeds, the UE 110 may not perform following RA attempts of this RA procedure. In a case where a RA attempt fails, the UE 110 may perform a following RA attempt, until a number of times of the RA attempts reaches a configured or preconfigured maximum number of the RA attempts of this RA procedure. In a case where no RA attempt of this RA procedure succeeds, this RA procedure fails.

In an embodiment, in a case where the UE 110 fails in a previous RA procedure or in a previous RA attempt, the network apparatus 120 may indicate to the UE 110 in the previous RA procedure/attempt the second group of RA resources in a random access response (RAR) 125 e.g. in a message 2 (Msg2) in case of a 4-step type RA or message B (MSGB) 130 in case of a 2-step type RA, so that the second group of RA resources may be used by the UE 110 for the following RA procedure/attempt. For example, the network apparatus 120 may indicate the second group of RA resources in a backoff indicator or a MAC subheader including the backoff indicator. The indicated second group of RA resources may be different from the RA resource used in the previous RA procedure/attempt, alternatively, the indicated second group of RA resources may include the RA resource used in the previous RA procedure/attempt. In some examples the RA attempt may refer to message 1 (Msg1)/preamble transmission in case of a 4-step type RA procedure or message A (MSGA) transmission in case of a 2-step type RA.

Additionally or alternatively, in an embodiment, in an operation 135, the network apparatus 120 may configure the UE 110 with the second group of RA resources via a dedicated and/or broadcast signaling. For example, the configuration of the second group of RA resources may be transmitted to the UE 110 via a dedicated and/or broadcast signaling. For example, the network apparatus 120 may indicate to the UE 110 the second group of RA resources in a radio resource control (RRC) connection reject message.

The configured second group of RA resources may be used for the following RA procedure/attempt in case that the UE 110 fails in the previous RA procedure/attempt. It may be appreciated that the failure of the previous RA procedure/attempt may be unnecessary for the performance of the operation 135. For example, the network apparatus 120 may configure the second group of RA resources before the UE 110 performs the previous RA procedure/attempt.

Additionally or alternatively, in an embodiment, the second group of RA resources may include a common RA resource. The common RA resource may be for example the RA resource not associated with a certain event triggering RA procedure or a certain type of UE. In this case the UE 110 may select the common RA resource to perform the RA procedure although the RA procedure is to be triggered by a certain event such as SDT and/or the UE 110 is of e.g. the RedCap type.

Additionally or alternatively, in an embodiment, at least one RA resource of the second group of RA resources may be associated with another event triggering a RA procedure and/or another type of a UE. This association may e.g. be configured or preconfigured at the UE 110 through RA partitioning. For example, assuming that the UE 110 is a 1Rx RedCap type UE and/or to perform a SDT RA procedure, the at least one RA resource of the second group of RA resources may be associated with a different event such as CovEnh and/or a different UE type such as 2Rx RedCap. In this case the UE 110 may select the RA resource associated with another event such as CovEnh and/or another type such as 2Rx RedCap to perform the RA procedure although the RA procedure is triggered by an event such as SDT and/or the UE 110 is of e.g. the 1Rx RedCap type.

Additionally or alternatively, in an embodiment, the network apparatus 120 may transmit, via a dedicated and/or broadcast signaling, to the UE 110 an indication 140 indicating whether the at least one RA resource of the second group of RA resources is allowed for the selection. For example, the indication 140 may indicate that in the second group of RA resources a specific RA resource associated with a specific event such as slicing and/or a specific type such as 2Rx RedCap are not allowed for the RA procedure triggered by other event and/or other type of UE. In this case the UE 110 cannot select that specific RA resource to perform the RA procedure.

Additionally or alternatively, the indication 140 may indicate whether the second group of RA resources is allowed for the selection. In a case where the indication 140 indicates that the second group of RA resources is not allowed for the selection, the UE 110 cannot select the second group of RA resources to perform the RA procedure. For example, in a case where the network apparatus 120 determines that no congestion occurs on the RA resources, the network apparatus 120 may transmit to the UE 110 the indication 140 indicating that the second group of RA resources is not allowed for the selection. For example, in a case where the network apparatus 120 determines that congestion occurs on the RA resources, the network apparatus 120 may transmit to the UE 110 the indication 140 indicating that the second group of RA resources is allowed for the selection. Therefore, with the indication 140, the UE 110 can perform the RA procedure via the second group of RA resources in case of e.g. congestion, and the UE 110 cannot perform the RA procedure via the second group of RA resources in case of e.g. no congestion, so that the RA partitioning may be enabled to allow RA resource isolation when e.g. not congested.

Additionally or alternatively, in an embodiment, the network apparatus 120 may transmit, e.g. broadcast, at least one selection probability 145 associated with the at least one RA resource of the second group of RA resources. The probability 145 may be e.g., a number between 0 and 1, representing the probability that a UE select the corresponding RA resource. For example, if the probability 145 is e.g. 0.7, the probability the UE will select the corresponding RA resource is 70%. Receiving the at least one selection probability 145, the UE 110 may select the RA resource based at least partly on the at least one selection probability 145.

In an operation 150, the UE 110 may select the RA resource from the second group of RA resources. As is described above, the second group of RA resources may be indicated by the RAR 125 or MSGB 130 in the previous RA procedure/attempt. Additionally or alternatively, the second group of RA resources may be configured in the operation 135 via a dedicated and/or broadcast signaling. The second group of RA resources may include at least one RA resource associated with another event and/or another type of a UE. Additionally or alternatively, the second group of RA resources may include a common RA resource. In a case where the UE 110 receives the indication 140, the UE 110 may select the RA resource from the second group of RA resources allowed by the indication 140 for the selection. Additionally or alternatively, in a case where the UE 110 receives the at least one selection probability 145, the UE 110 may select the RA resource based at least partly on the at least one selection probability 145.

In an embodiment, the RA resource may be selected after a previous RA procedure/attempt fails. For example, the network apparatus 120 may indicate the second group of RA resources in the RAR 125 or MSGB 130 in the previous RA procedure/attempt, and then in the operation 150 the UE 110 may select the RA resource from the second group of RA resources for the following RA procedure/attempt. Alternatively, for example, in a case the UE 110 does not receive a response from the network apparatus 120 for a period after initiating the previous RA procedure/attempt, the UE 110 may perform the operation 150 for the selection of the RA resource.

Alternatively, the selection of RA resource from the second group of RA resource is not related to a previous RA procedure. For example, the UE 110 may select the RA resource from the second group of RA resources in the operation 150 after a successful previous RA procedure or without the previous RA procedure.

Alternatively, the RA resource may be selected within the RA procedure. For example, the UE 110 may select the RA resource in the operation 150 between different attempts within the RA procedure.

In an operation 155, the UE 110 may perform the RA procedure on the selected RA resource. In a case where the UE 110 selects the RA resource in the operation 150 before the RA procedure, the UE 110 may initiate the RA procedure on the selected RA resource in the operation 155. The RA procedure may be a 2-step type RA procedure or a 4-step type RA procedure. In a case where the UE 110 selects the RA resource in the operation 150 within the RA procedure, for example, between a previous attempt and a following attempt, in the operation 155 the UE 110 may perform the following attempt on the selected RA resource.

Accordingly, the network apparatus 120 may process the RA procedure performed by the UE 110 on the selected RA resource in an operation 160.

Since the RA procedure performed by the UE 110 is triggered by the event associated with the first group of RA resources and/or the type of the UE 110 is associated with the first group of RA resources, it is more possible that the RA procedure performed on the RA resource selected from the second group of RA resource will be successful in case of congestion in the first group of RA resources, so that the usage of the RA resources may be optimized in case of congestion.

Then, the UE 110 may transmit information 165 indicating the event triggering the RA procedure and/or the type of the UE 110 to the network apparatus 120, so that the network apparatus 120 may know the event triggering the RA procedure and/or the type of the UE 110. The information 165 indicating the event triggering the RA procedure and/or the type of the UE 110 may be transmitted in Msg1, message 3 (Msg3) or MSGA in the RA procedure or in a subsequent uplink (UL) transmission after the RA procedure.

In one embodiment, the UE 110 may indicate to the network apparatus 120 its primary event triggering the RA procedure and/or the type of the UE 110 by the preamble/PRACH resource used for the RA and the secondary/third/etc. event triggering the RA procedure and/or the type of the UE is indicated by the Msg3 in case of 4-step type RA or by the MSGA physical uplink shared channel (PUSCH) in case of 2-step type RA.

In one example, a RedCap UE 110 attempting SDT determines if cell reference signal received power (RSRP) is above a certain threshold and performs SDT over regular SDT RA resources (not separately configured for Redcap UEs) in case the RSRP is above the certain threshold—such a threshold could be higher than a RSRP threshold to select the SDT procedure; in this case, the RedCap UE also indicates its RedCap capability in the Msg3/MSGA PUSCH of the SDT procedure. In case the RSRP is below the certain threshold, the RedCap UE 110 performs RA over RedCap random access channel (RACH) and indicates over Msg3/MSGA PUSCH it is attempting SDT; in this case, the SDT transmission would happen in subsequent transmissions after the RA procedure.

In one option, which event triggering the RA procedure and/or which type of the UE 110 is primary for the UE 110 can be configurable by the network apparatus 120 or determined based on conditions (e.g., as above). The other event triggering the RA procedure and/or the type of the UE 110 that the UE 110 supports and enabled by the network apparatus 120 is then the secondary ones and to be indicated to the network apparatus 120 in Msg3/MSGA PUSCH or subsequent UL transmission. E.g. the network apparatus 120 may only configure separate resources for SDT, then other events triggering the RA procedure and/or the type of the UE 110 may be indicated later.

In one example common RA resources are configured for more than one event triggering the RA procedure and/or the type of the UE 110.

In one example, responses from the network apparatus 120 could provide multiple UL grant options, e.g. via Msg2, in case it is not certain which kind of resource the UE 110 is requesting when there is no hard split among the resources for different events triggering RA procedures. UE 110 may then select the UL grant according to the initiated event triggering the RA procedure and/or the type of the UE 110 for Msg3 transmission. Then no further explicit indication is needed in the Msg3 or subsequent UL transmission about the event triggering the RA procedure and/or the type of the UE 110. In one example, such different Msg3 resources could be all overlapping in time/frequency but, e.g., the modulation and coding scheme (MCS) could be different or other used parameters.

Figure 2:
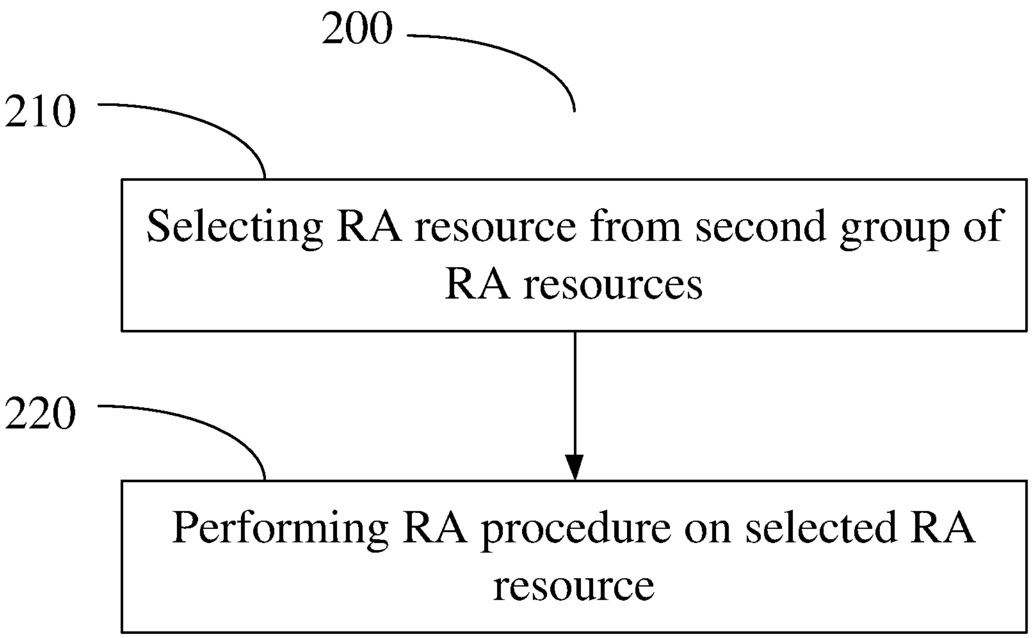
FIG. 2 shows a flow chart illustrating an example method for random access in case of congestion according to an embodiment of the present disclosure.

FIG. 2 shows a flow chart illustrating an example method 200 for random access in case of congestion according to an embodiment of the present disclosure. The example method 200 may be performed for example at a UE such as the UE 110.

Referring to the FIG. 2, the example method 200 may include an operation 210 of selecting a random access resource from a second group of random access resources, and an operation 220 of performing a random access procedure on the selected random access resource. The second group of random access resources may be different from a first group of random access resources, and the first group of random access resources may be associated with an event triggering the random access procedure and/or a type of the user equipment.

Details of the operation 210 may refer to the above descriptions with respect to at least the operation 150, and repetitive descriptions thereof are omitted here.

Details of the operation 220 may refer to the above descriptions with respect to at least the operation 155, and repetitive descriptions thereof are omitted here.

In an embodiment, the random access resource may be selected after a previous random access procedure or a previous random access attempt fails. The more details may refer to the above descriptions with respect to at least the operation 150, and repetitive descriptions thereof are omitted here.

In an embodiment, at least one random access resource of the second group of random access resources may be associated with another event triggering a random access procedure and/or another type of a user equipment. The more details may refer to the above descriptions with respect to at least the another event triggering a RA procedure and/or the another type of a UE, and repetitive descriptions thereof are omitted here.

In an embodiment, the example method 200 may further include an operation of receiving, via a dedicated and/or broadcast signaling from a network apparatus, an indication indicating whether the at least one random access resource of the second group of random access resources is allowed for the selection. The more details may refer to the above descriptions with respect to at least the indication 140, and repetitive descriptions thereof are omitted here.

In an embodiment, the example method 200 may further include an operation of receiving at least one selection probability associated with the at least one random access resource of the second group of random access resources, wherein the random access resource may be selected based at least partly on the at least one selection probability. The more details may refer to the above descriptions with respect to at least the probability 145, and repetitive descriptions thereof are omitted here.

In an embodiment, the second group of random access resources may be configured by a network apparatus via a dedicated and/or broadcast signaling. The more details may refer to the above descriptions with respect to at least the operation 135, and repetitive descriptions thereof are omitted here.

In an embodiment, the second group of random access resources may be indicated in a random access response or MSGB in the previous random access procedure or the previous random access attempt. The more details may refer to the above descriptions with respect to at least the RAR 125 or MSGB 130, and repetitive descriptions thereof are omitted here.

In an embodiment, the second group of random access resources may include a common random access resource.

The more details may refer to the above descriptions with respect to at least the common RA resource, and repetitive descriptions thereof are omitted here.

In an embodiment, the example method 200 may further include an operation of transmitting information indicating the event triggering the random access procedure and/or the type of the user equipment. The more details may refer to the above descriptions with respect to at least the information 165, and repetitive descriptions thereof are omitted here.

Figure 3:
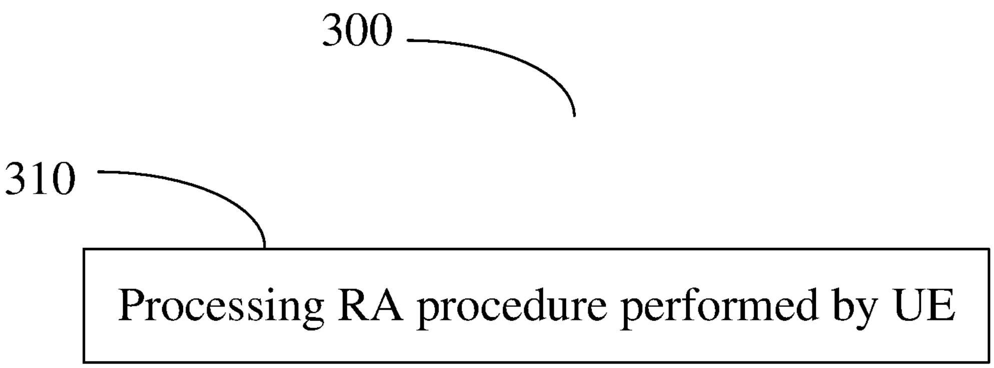
FIG. 3 shows a flow chart illustrating an example method for random access in case of congestion according to an embodiment of the present disclosure.

FIG. 3 shows a flow chart illustrating an example method 300 for random access in case of congestion according to an embodiment of the present disclosure. The example method 300 may be performed for example at a network apparatus in the RAN such as the network apparatus 120.

Referring to the FIG. 3, the example method 300 may include an operation 310 of processing a random access procedure performed by a user equipment on a random access resource, wherein the random access resource may be selected by the user equipment from a second group of random access resources, and wherein the second group of random access resources may be different from a first group of random access resources, and the first group of random access resources may be associated with an event triggering the random access procedure and/or a type of the user equipment.

Details of the operation 310 may refer to the above descriptions with respect to at least the operation 160, and repetitive descriptions thereof are omitted here.

In an embodiment, the random access resource may be selected by the user equipment after a previous random access procedure or a previous random access attempt fails. The more details may refer to the above descriptions with respect to at least the operation 150, and repetitive descriptions thereof are omitted here.

In an embodiment, at least one random access resource of the second group of random access resources may be associated with another event triggering a random access procedure and/or another type of a user equipment. The more details may refer to the above descriptions with respect to at least the another event triggering a RA procedure and/or the another type of a UE, and repetitive descriptions thereof are omitted here.

In an embodiment, the example method 300 may further include an operation of transmitting, via a dedicated and/or broadcast signaling, an indication indicating whether the at least one random access resource of the second group of random access resources is allowed for the selection. The more details may refer to the above descriptions with respect to at least the indication 140, and repetitive descriptions thereof are omitted here.

In an embodiment, the example method 300 may further include an operation of transmitting at least one selection probability associated with the at least one random access resource of the second group of random access resources, wherein the random access resource may be selected by the user equipment based at least partly on the at least one selection probability. The more details may refer to the above descriptions with respect to at least the probability 145, and repetitive descriptions thereof are omitted here.

In an embodiment, the example method 300 may further include an operation of configuring the second group of random access resources via a dedicated and/or broadcast signaling. The more details may refer to the above descriptions with respect to at least the operation 135, and repetitive descriptions thereof are omitted here.

In an embodiment, the second group of random access resources may be indicated in a random access response or MSGB in the previous random access procedure or the previous random access attempt. The more details may refer to the above descriptions with respect to at least the RAR 125 or MSGB 130, and repetitive descriptions thereof are omitted here.

In an embodiment, the second group of random access resources may include a common random access resource. The more details may refer to the above descriptions with respect to at least the common RA resource, and repetitive descriptions thereof are omitted here.

In an embodiment, the example method 300 may further include an operation of receiving information indicating the event triggering the random access procedure and/or the type of the user equipment. The more details may refer to the above descriptions with respect to at least the information 165, and repetitive descriptions thereof are omitted here.

Figure 4:
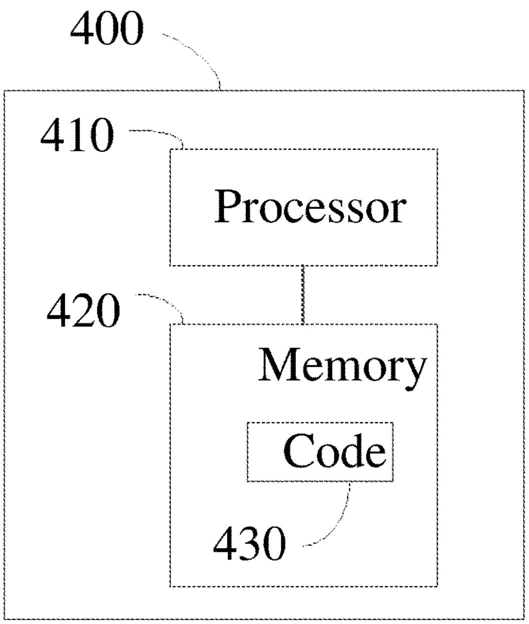
FIG. 4 shows a block diagram illustrating an apparatus for random access in case of congestion according to an embodiment of the present disclosure.

FIG. 4 shows a block diagram illustrating an apparatus for random access in case of congestion according to an embodiment of the present disclosure. The apparatus, for example, may be at least part of the UE 110 in the above examples.

As shown in the FIG. 4, the example apparatus 400 may include at least one processor 410 and at least one memory 420 that may include computer program code 430. The at least one memory 420 and the computer program code 430 may be configured to, with the at least one processor 410, cause the apparatus 400 at least to perform the example method 200 described above.

In various example embodiments, the at least one processor 410 in the example apparatus 400 may include, but not limited to, at least one hardware processor, including at least one microprocessor such as a central processing unit (CPU), a portion of at least one hardware processor, and any other suitable dedicated processor such as those developed based on for example Field Programmable Gate Array (FPGA) and Application Specific Integrated Circuit (ASIC). Further, the at least one processor 410 may also include at least one other circuitry or element not shown in the FIG. 4.

In various example embodiments, the at least one memory 420 in the example apparatus 400 may include at least one storage medium in various forms, such as a volatile memory and/or a non-volatile memory. The volatile memory may include, but not limited to, for example, a random-access memory (RAM), a cache, and so on. The non-volatile memory may include, but not limited to, for example, a read only memory (ROM), a hard disk, a flash memory, and so on. Further, the at least memory 420 may include, but are not limited to, an electric, a magnetic, an optical, an electromagnetic, an infrared, or a semiconductor system, apparatus, or device or any combination of the above.

Further, in various example embodiments, the example apparatus 400 may also include at least one other circuitry, element, and interface, for example at least one I/O interface, at least one antenna element, and the like.

In various example embodiments, the circuitries, parts, elements, and interfaces in the example apparatus 400, including the at least one processor 410 and the at least one memory 420, may be coupled together via any suitable connections including, but not limited to, buses, crossbars, wiring and/or wireless lines, in any suitable ways, for example electrically, magnetically, optically, electromagnetically, and the like.

It is appreciated that the structure of the apparatus on the side of the UE 110 is not limited to the above example apparatus 400.

Figure 5:
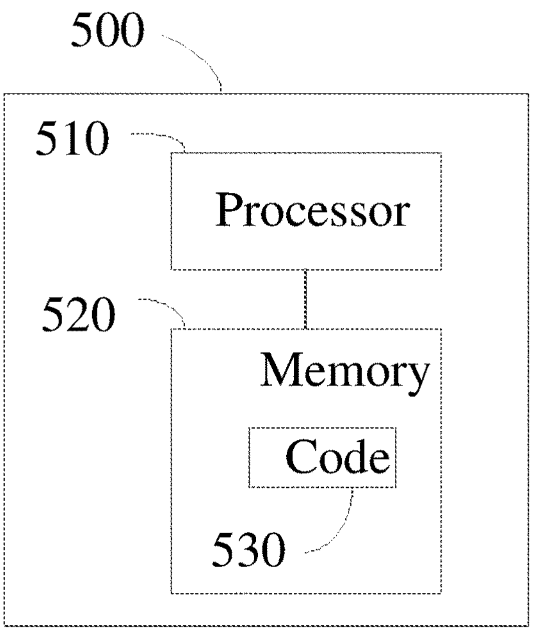
FIG. 5 shows a block diagram illustrating an apparatus for random access in case of congestion according to an embodiment of the present disclosure.

FIG. 5 shows a block diagram illustrating an apparatus for random access in case of congestion according to an embodiment of the present disclosure. The apparatus, for example, may be at least part of the network apparatus 120 in the above examples.

As shown in the FIG. 5, the example apparatus 500 may include at least one processor 510 and at least one memory 520 that may include computer program code 530. The at least one memory 520 and the computer program code 530 may be configured to, with the at least one processor 510, cause the apparatus 500 at least to perform at least one of the example method 300 described above.

In various example embodiments, the at least one processor 510 in the example apparatus 500 may include, but not limited to, at least one hardware processor, including at least one microprocessor such as a central processing unit (CPU), a portion of at least one hardware processor, and any other suitable dedicated processor such as those developed based on for example Field Programmable Gate Array (FPGA) and Application Specific Integrated Circuit (ASIC). Further, the at least one processor 510 may also include at least one other circuitry or element not shown in the FIG. 5.

In various example embodiments, the at least one memory 520 in the example apparatus 500 may include at least one storage medium in various forms, such as a volatile memory and/or a non-volatile memory. The volatile memory may include, but not limited to, for example, a random-access memory (RAM), a cache, and so on. The non-volatile memory may include, but not limited to, for example, a read only memory (ROM), a hard disk, a flash memory, and so on. Further, the at least memory 520 may include, but are not limited to, an electric, a magnetic, an optical, an electromagnetic, an infrared, or a semiconductor system, apparatus, or device or any combination of the above.

Further, in various example embodiments, the example apparatus 500 may also include at least one other circuitry, element, and interface, for example at least one I/O interface, at least one antenna element, and the like.

In various example embodiments, the circuitries, parts, elements, and interfaces in the example apparatus 500, including the at least one processor 510 and the at least one memory 520, may be coupled together via any suitable connections including, but not limited to, buses, crossbars, wiring and/or wireless lines, in any suitable ways, for example electrically, magnetically, optically, electromagnetically, and the like.

It is appreciated that the structure of the apparatus on the side of the network apparatus 120 is not limited to the above example apparatus 500.

Figure 6:
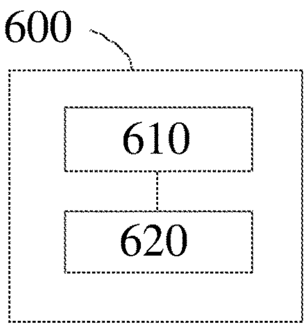
FIG. 6 shows a block diagram illustrating an apparatus for random access in case of congestion according to an embodiment of the present disclosure.

FIG. 6 shows a block diagram illustrating an apparatus for random access in case of congestion according to an embodiment of the present disclosure. The apparatus, for example, may be at least part of the UE 110 in the above examples.

As shown in FIG. 6, the example apparatus 600 may include means 610 for performing the operation 210 of the example method 200, and means 620 for performing the operation 220 of the example method 200. In one or more another example embodiments, at least one I/O interface, at least one antenna element, and the like may also be included in the example apparatus 600.

In some example embodiments, examples of means in the example apparatus 600 may include circuitries. For example, an example of means 610 may include a circuitry configured to perform the operation 210 of the example method 200, and an example of means 620 may include a circuitry configured to perform the operation 220 of the example method 200. In some example embodiments, examples of means may also include software modules and any other suitable function entities.

Figure 7:
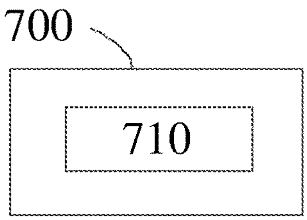
FIG. 7 shows a block diagram illustrating an apparatus for random access in case of congestion according to an embodiment of the present disclosure.

FIG. 7 shows a block diagram illustrating an apparatus for random access in case of congestion according to an embodiment of the present disclosure. The apparatus, for example, may be at least part of the network apparatus 120 in the above examples.

As shown in the FIG. 7, the example apparatus 700 may include means 710 for performing the operation 310 of the example method 300. In one or more another example embodiments, at least one I/O interface, at least one antenna element, and the like may also be included in the example apparatus 700.

In some example embodiments, examples of means in the example apparatus 700 may include circuitries. For example, an example of means 710 may include a circuitry configured to perform the operation 310 of the example method 300. In some example embodiments, examples of means may also include software modules and any other suitable function entities.

The term "circuitry" throughout this disclosure may refer to one or more or all of the following: (a) hardware-only circuit implementations (such as implementations in only analog and/or digital circuitry); (b) combinations of hardware circuits and software, such as (as applicable) (i) a combination of analog and/or digital hardware circuit(s) with software/firmware and (ii) any portions of hardware processor(s) with software (including digital signal processor(s)), software, and memory(ies) that work together to cause an apparatus, such as a mobile phone or server, to perform various functions); and (c) hardware circuit(s) and or processor(s), such as a microprocessor(s) or a portion of a microprocessor(s), that requires software (e.g., firmware) for operation, but the software may not be present when it is not needed for operation. This definition of circuitry applies to one or all uses of this term in this disclosure, including in any claims. As a further example, as used in this disclosure, the term circuitry also covers an implementation of merely a hardware circuit or processor (or multiple processors) or portion of a hardware circuit or processor and its (or their) accompanying software and/or firmware. The term circuitry also covers, for example and if applicable to the claim element, a baseband integrated circuit or processor integrated circuit for a mobile device or a similar integrated circuit in server, a cellular network device, or other computing or network device.

Another example embodiment may relate to computer program codes or instructions which may cause an apparatus to perform at least respective methods described above. Another example embodiment may be related to a computer readable medium having such computer program codes or instructions stored thereon. In some embodiments, such a computer readable medium may include at least one storage medium in various forms such as a volatile memory and/or a non-volatile memory. The volatile memory may include, but not limited to, for example, a RAM, a cache, and so on. The non-volatile memory may include, but not limited to, a ROM, a hard disk, a flash memory, and so on. The non-volatile memory may also include, but are not limited to, an electric, a magnetic, an optical, an electromagnetic, an infrared, or a semiconductor system, apparatus, or device or any combination of the above.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." The word "coupled", as generally used herein, refers to two or more elements that may be either directly connected, or connected by way of one or more intermediate elements. Likewise, the word "connected", as generally used herein, refers to two or more elements that may be either directly connected, or connected by way of one or more intermediate elements. Additionally, the words "herein," "above," "below," and words of similar import, when used in this application, shall refer to this application as a whole and not to any particular portions of this application. Where the context permits, words in the description using the singular or plural number may also include the plural or singular number respectively. The word "or" in reference to a list of two or more items, that word covers all of the following interpretations of the word: any of the items in the list, all of the items in the list, and any combination of the items in the list.

Moreover, conditional language used herein, such as, among others, "can," "could," "might," "may," "e.g.," "for example," "such as" and the like, unless specifically stated otherwise, or otherwise understood within the context as used, is generally intended to convey that certain embodiments include, while other embodiments do not include, certain features, elements and/or states. Thus, such conditional language is not generally intended to imply that features, elements and/or states are in any way required for one or more embodiments or that one or more embodiments necessarily include logic for deciding, with or without author input or prompting, whether these features, elements and/or states are included or are to be performed in any particular embodiment.

As used herein, the term "determine/determining" (and grammatical variants thereof) can include, not least: calculating, computing, processing, deriving, measuring, investigating, looking up (for example, looking up in a table, a database or another data structure), ascertaining and the like. Also, "determining" can include receiving (for example, receiving information), accessing (for example, accessing data in a memory), obtaining and the like. Also, "determine/determining" can include resolving, selecting, choosing, establishing, and the like.

While some embodiments have been described, these embodiments have been presented by way of example, and are not intended to limit the scope of the disclosure. Indeed, the apparatus, methods, and systems described herein may be embodied in a variety of other forms; furthermore, various omissions, substitutions and changes in the form of the methods and systems described herein may be made without departing from the spirit of the disclosure. For example, while blocks are presented in a given arrangement, alternative embodiments may perform similar functionalities with different components and/or circuit topologies, and some blocks may be deleted, moved, added, subdivided, combined, and/or modified. At least one of these blocks may be implemented in a variety of different ways. The order of these blocks may also be changed. Any suitable combination of the elements and acts of the some embodiments described above can be combined to provide further embodiments. The accompanying claims and their equivalents are intended to cover such forms or modifications as would fall within the scope and spirit of the disclosure.

Abbreviations used in the description and/or in the figures are defined as follows:

BS base station
CovEnh coverage enhancement
MAC medium access control
MCS modulation and coding scheme
MSGA message A
MSGB message B
Msg1 message 1
Msg2 message 2
Msg3 message 3
PRACH physical random access channel
PUSCH physical uplink shared channel
RA random access
RAN radio access network
RAR random access response
RedCap reduced capability
RRC radio resource control
RSRP reference signal received power
SIB system information block
SDT small data transmission
UB user equipment
UL uplink
1Rx RedCap single antenna/branch RedCap
2Rx RedCap dual antenna/branch RedCap

What is claimed is:

1. An apparatus comprising:

at least one processor; and at least one memory comprising computer program code, the at least one memory and the computer program code being configured to, with the at least one processor, cause the apparatus as a user equipment to perform:

selecting a random access resource from a second group of random access resources; and performing a random access procedure on the selected random access resource, wherein the second group of random access resources is different from a first group of random access resources, and the first group of random access resources is associated with an event triggering the random access procedure and/or a type of the user equipment, wherein at least one random access resource of the second group of random access resources is associated with another event triggering a random access procedure and/or another type of a user equipment, wherein the at least one memory and the computer program code are further configured to, with the at least one processor, cause the apparatus to further perform:

receiving, via a dedicated and/or broadcast signaling from a network apparatus, an indication indicating whether the at least one random access resource of the second group of random access resources is allowed for the selection.

2. The apparatus of claim 1, wherein the random access resource is selected after a previous random access procedure or a previous random access attempt fails.

3. The apparatus of claim 2, wherein the second group of random access resources is indicated in a random access response or Message B (MsgB) in the previous random access procedure or the previous random access attempt.

4. The apparatus of claim 1, wherein the at least one memory and the computer program code are further configured to, with the at least one processor, cause the apparatus to further perform:

receiving at least one selection probability associated with the at least one random access resource of the second group of random access resources, wherein the random access resource is selected based at least partly on the at least one selection probability.

5. The apparatus of claim 1, wherein the second group of random access resources is configured by a network apparatus via a dedicated and/or broadcast signaling.

6. The apparatus of claim 1, wherein the second group of random access resources comprises a common random access resource.

7. The apparatus of claim 1, wherein the at least one memory and the computer program code are further configured to, with the at least one processor, cause the apparatus to further perform:

transmitting information indicating the event triggering the random access procedure and/or the type of the user equipment.

8. An apparatus comprising:

at least one processor; and at least one memory comprising computer program code, the at least one memory and the computer program code being configured to, with the at least one processor, cause the apparatus to perform:

processing a random access procedure performed by a user equipment on a random access resource, wherein the random access resource is selected by the user equipment from a second group of random access resources, and wherein the second group of random access resources is different from a first group of random access resources, and the first group of random access resources is associated with an event triggering the random access procedure and/or a type of the user equipment, wherein at least one random access resource of the second group of random access resources is associated with another event triggering a random access procedure and/or another type of a user equipment, wherein the at least one memory and the computer program code are further configured to, with the at least one processor, cause the apparatus to further perform:

transmitting, via a dedicated and/or broadcast signaling, an indication indicating whether the at least one random access resource of the second group of random access resources is allowed for the selection.

9. The apparatus of claim 8, wherein the random access resource is selected by the user equipment after a previous random access procedure or a previous random access attempt fails.

10. The apparatus of claim 9, the second group of random access resources is indicated in a random access response or Message B (MsgB) in the previous random access procedure or the previous random access attempt.

11. The apparatus of claim 8, wherein the at least one memory and the computer program code are further configured to, with the at least one processor, cause the apparatus to further perform:

transmitting at least one selection probability associated with the at least one random access resource of the second group of random access resources, wherein the random access resource is selected by the user equipment based at least partly on the at least one selection probability.

12. The apparatus of claim 8, wherein the at least one memory and the computer program code are further configured to, with the at least one processor, cause the apparatus to further perform:

configuring the second group of random access resources via a dedicated and/or broadcast signaling.

13. The apparatus of claim 8, wherein the second group of random access resources comprises a common random access resource.

14. The apparatus of claim 8, wherein the at least one memory and the computer program code are further configured to, with the at least one processor, cause the apparatus to further perform:

receiving information indicating the event triggering the random access procedure and/or the type of the user equipment.

* * * * *